(12) United States Patent
Shoemaker et al.

(10) Patent No.: US 11,658,841 B2
(45) Date of Patent: May 23, 2023

(54) LOCATION-BASED DEVICE AUTOMATION

(71) Applicant: Apple Inc., Cupertino, CA (US)

(72) Inventors: David J. Shoemaker, Redwood City, CA (US); Michael I. Ingrassia, Jr., San Jose, CA (US); Nathaniel P. Hramits, San Jose, CA (US)

(73) Assignee: Apple Inc., Cupertino, CA (US)

(*) Notice: Subject to any disclaimer, the term of this patent is extended or adjusted under 35 U.S.C. 154(b) by 135 days.

(21) Appl. No.: 17/128,874

(22) Filed: Dec. 21, 2020

(65) Prior Publication Data

US 2021/0184883 A1 Jun. 17, 2021

Related U.S. Application Data

(60) Continuation of application No. 16/853,494, filed on Apr. 20, 2020, now Pat. No. 10,873,475, which is a (Continued)

(51) Int. Cl.
| | |
|---|---|
| *H04L 12/28* | (2006.01) |
| *H04W 4/029* | (2018.01) |
| *H04W 4/02* | (2018.01) |
| *H04L 67/125* | (2022.01) |
| *H04W 4/021* | (2018.01) |
| *H05B 47/19* | (2020.01) |
| *H05B 47/115* | (2020.01) |

(Continued)

(52) U.S. Cl.
CPC ...... *H04L 12/2818* (2013.01); *H04L 12/2829* (2013.01); *H04L 67/125* (2013.01); *H04W 4/021* (2013.01); *H04W 4/023* (2013.01); *H04W 4/027* (2013.01); *H04W 4/029* (2018.02); *H05B 47/105* (2020.01); *H05B 47/115* (2020.01); *H05B 47/19* (2020.01); *H04L 67/306* (2013.01); *H04W 4/33* (2018.02)

(58) Field of Classification Search
CPC ..... H04L 12/2803–2838; H04L 67/125; H04L 67/306; H04W 4/02–029; Y02B 20/40
See application file for complete search history.

(56) References Cited

U.S. PATENT DOCUMENTS

| | | | |
|---|---|---|---|
| 6,400,956 | B1 | 6/2002 | Richton |
| 7,515,917 | B2 | 4/2009 | Casey |

(Continued)

FOREIGN PATENT DOCUMENTS

| | | |
|---|---|---|
| JP | H06189011 | 7/1994 |
| JP | 2001231083 | 8/2001 |

(Continued)

OTHER PUBLICATIONS

Office Action in Korean App. No. 10-2013-66785, dated Jun. 13, 2014, 10 pages.

(Continued)

*Primary Examiner* — Ronald Eisner
(74) *Attorney, Agent, or Firm* — Aikin & Gallant, LLP

(57) ABSTRACT

This disclosure describes systems, methods, and computer program products for identifying a presence of a plurality of mobile devices at a geographic location, determining security system automation settings for the geographic location based on the identified plurality of mobile devices, and based on the determination, configuring a security system automation setting for the geographic location.

20 Claims, 5 Drawing Sheets

Related U.S. Application Data continuation of application No. 16/143,570, filed on Sep. 27, 2018, now Pat. No. 10,659,248, which is a continuation of application No. 15/587,516, filed on May 5, 2017, now Pat. No. 10,142,123, which is a continuation of application No. 14/542,800, filed on Nov. 17, 2014, now Pat. No. 9,647,850, which is a division of application No. 13/493,823, filed on Jun. 11, 2012, now Pat. No. 9,071,453.

(51) Int. Cl.
*H05B 47/105* (2020.01)
*H04L 67/306* (2022.01)
*H04W 4/33* (2018.01)

(56) References Cited

U.S. PATENT DOCUMENTS

| | | | |
|---|---|---|---|
| 8,364,669 | B1 | 1/2013 | Chowdhury et al. |
| 8,386,620 | B2 | 2/2013 | Chatterjee |
| 8,639,706 | B1 | 1/2014 | Bilinski et al. |
| 9,071,453 | B2 | 6/2015 | Shoemaker et al. |
| 9,474,134 | B2 | 10/2016 | Knibbe |
| 9,520,250 | B2 | 12/2016 | O'Keeffe |
| 9,541,910 | B2 | 1/2017 | Madonna et al. |
| 9,647,850 | B2 | 5/2017 | Shoemaker et al. |
| 10,873,475 | B2 | 12/2020 | Shoemaker et al. |
| 2002/0143930 | A1 | 10/2002 | Babu et al. |
| 2004/0003051 | A1 | 1/2004 | Krzyzanowski et al. |
| 2006/0123080 | A1 | 6/2006 | Baudino et al. |
| 2008/0189359 | A1 | 8/2008 | Sasaki et al. |
| 2008/0271123 | A1 | 10/2008 | Ollis et al. |
| 2009/0319616 | A1 | 12/2009 | Lewis, II et al. |
| 2011/0125329 | A1 | 5/2011 | Oswald |
| 2011/0142016 | A1 | 6/2011 | Chatterjee |
| 2011/0188439 | A1 | 8/2011 | Mao et al. |
| 2011/0195665 | A1* | 8/2011 | Friedlaender .......... G08C 17/02 455/41.2 |
| 2011/0195701 | A1 | 8/2011 | Cook et al. |
| 2012/0042392 | A1 | 2/2012 | Wu |
| 2012/0056746 | A1 | 3/2012 | Kaigler et al. |
| 2012/0065802 | A1 | 3/2012 | Seeber et al. |
| 2012/0172027 | A1* | 7/2012 | Partheesh ............. H04W 4/021 455/420 |
| 2012/0303415 | A1 | 11/2012 | Edelson |
| 2013/0137451 | A1 | 5/2013 | Meredith et al. |
| 2013/0331087 | A1 | 12/2013 | Shoemaker et al. |
| 2014/0248910 | A1 | 9/2014 | Dave et al. |
| 2015/0072674 | A1 | 3/2015 | Shoemaker et al. |
| 2015/0095774 | A1 | 4/2015 | Bates et al. |

FOREIGN PATENT DOCUMENTS

| | | |
|---|---|---|
| JP | 2003043242 | 10/2003 |
| JP | 2003281654 | 10/2003 |
| JP | 2005295160 | 10/2005 |
| JP | 2005354324 | 12/2005 |
| JP | 2008153859 | 7/2008 |
| JP | 2008171031 | 7/2008 |
| JP | 2008193246 | 8/2008 |
| JP | 2009228910 | 10/2009 |
| JP | 2010517400 | 5/2010 |
| JP | 2011061746 | 3/2011 |
| JP | 2011075246 | 4/2011 |
| JP | 2011076196 | 4/2011 |
| JP | 2011151662 | 8/2011 |
| JP | 2011257918 | 12/2011 |
| KR | 101111017 | 2/2012 |
| WO | 2010139149 A1 | 12/2010 |
| WO | 2011079877 | 7/2011 |
| WO | 2011121299 | 10/2011 |
| WO | 2016145235 | 9/2016 |

OTHER PUBLICATIONS

Office Action in Japanese App. No. 2013-121960, dated Aug. 11, 2014, 6 pages (with English translation).

Patent Examination Report in Australian App. No. 2013205582, dated Aug. 8, 2014, 4 pages.

U.S. Non-Final Office Action for U.S. Appl. No. 13/493,823 dated Dec. 1, 2014, 49 pages.

Extended European Search Report in EP Application No. 13171523.7, dated Jan. 21, 2015, 10 pages.

Shin and Woo., "Service Conflict Management Framework for Multi-user Inhabited Smart Home," Journal of Universal Computer Science, Jun. 2009, pp. 2330-2352, Retrieved from the Internet via URL: http://www.iucs.org/jucs 15 12 2330 2352 shin.pdf [retrieved on Dec. 5, 2014].

Office Action in Japanese Application No. 2016-079080, dated Jul. 4, 2016, 10 pages. (with English translation).

* cited by examiner

| Device ID | Environment | Radius | Mode |
|---|---|---|---|
| Mobile Device 1 | Home | L<50 feet | Home |
| Mobile Device 1 | Home | 1 mi<L<50 ft | Away |
| Mobile Device 1 | Home | 30 mi<L<1 mi | Vacation |
| Mobile Device 2 | Home | L<75 ft | Home |
| Mobile Device 2 | Home | 2 mi<L<75 ft | Away |
| Mobile Device 2 | Home | 50 mi<L<2 mi | Vacation |

LOCATION-BASED DEVICE AUTOMATION

CROSS-REFERENCE TO RELATED APPLICATION

This application is a continuation of and claims the benefit of priority to U.S. patent application Ser. No. 16/853,494, filed Apr. 20, 2020, which is a Continuation of U.S. patent application Ser. No. 16/143,570, filed Sep. 27, 2018, now U.S. Pat. No. 10,659,248, Issued Apr. 29, 2020, which is a Continuation of U.S. patent application Ser. No. 15/587,516, filed May 5, 2017, now U.S. Pat. No. 10,142,123, Issued Nov. 27, 2018, which is a Continuation of U.S. patent application Ser. No. 14/542,800, filed Nov. 17, 2014, now U.S. Pat. No. 9,647,850, Issued May 9, 2017, which is a Divisional of U.S. patent application Ser. No. 13/493,823, filed Jun. 11, 2012, now U.S. Pat. No. 9,071,453, Issued on Jun. 30, 2015, each of which is incorporated herein by reference in their entirety.

TECHNICAL FIELD

This disclosure is generally related to automation of devices.

BACKGROUND

Devices (e.g., home appliances) can be automated based on various settings. For example, home lighting can be configured to activate or deactivate depending on a day and time.

SUMMARY

This disclosure describes systems, methods, and computer program products for location-based device automation. Devices (e.g., lights, appliances, and climate control systems) associated with a particular geographic location can be automated based on a geographic location of one or more mobile devices. As described in this specification, a particular geographic location can be a room, office, building, residence, or any other structure that is capable of housing devices. Automation of a device can include activating or deactivating the device, or adjusting one or more settings of the device.

Automation modes (e.g., a home mode, an away mode, or a vacation mode) can be used to adjust automation settings for one or more devices. A particular automation mode can be selected to automate (e.g., adjust the settings) one or more devices using the configured automation settings for the particular automation mode. An automation setting can indicate whether a particular device should be active or inactive. An automation setting can also indicate a particular setting for the particular device (e.g., a thermostat setting, a volume level, or a light dimming setting).

A user profile can be associated with a mobile device, and can be used to personalize automation of one or more devices. The user profile can be used to select a preferred automation mode and/or can personalize automation of individual devices based on preferences stored in the user profile. Automation modes for a particular geographic location can be configured differently based on a presence of multiple mobile devices that are associated with the particular geographic location.

In some implementations, a method comprises: determining a distance of a mobile device from a location, the mobile device being associated with the location; determining a duration that the mobile device is located beyond a threshold distance from the location; and selecting an automation mode for the location based in part on the determined distance and duration of the mobile device.

In some implementations, a system comprises one or more processors and memory coupled to the one or more processors. The memory is configured for storing instructions, which, when executed by the one or more processors, causes the one or more processors to perform operations. The operations comprise determining a distance of a mobile device from a particular geographic location, the mobile device being associated with the particular geographic location; determining a duration that the mobile device is located beyond a threshold distance from the location; and selecting an automation mode for the location based in part on the determined distance and duration of the mobile device. Other implementations are disclosed that are directed to methods and systems.

In some implementations, a method comprises identifying a presence of a plurality of mobile devices at a particular geographic location; determining an entertainment option to be played at the particular geographic location based on the identified plurality of mobile devices; and based on the determination, selecting an entertainment option to be played at the particular geographic location.

In some implementations, a system comprises one or more processors and memory coupled to the one or more processors. The memory is configured for storing instructions, which, when executed by the one or more processors, causes the one or more processors to perform operations. The operations comprise identifying a presence of a plurality of mobile devices at a particular geographic location; determining an entertainment option to be played at the particular geographic location based on the identified plurality of mobile devices; and based on the determination, selecting an entertainment option to be played at the particular geographic location.

Particular implementations of the location-based home automation application disclosed herein provide one or more of the following advantages. Devices located in a particular geographic location can be automated based in part on a distance of a mobile device from that particular geographic location. Devices (e.g., lighting systems, appliances, and climate control system) can be automated using an automation mode (e.g., home, away, or vacation) or preferred automation settings of individual devices based in part on a distance of a mobile device. Automation modes can be personalized using one or more user profiles associated with the mobile device. Detection of multiple mobile devices at a particular geographic location, including mobile devices that are not associated with the particular geographic location, can be used to adjust existing automation modes.

A further embodiment provides for a method comprising identifying, by a network device, presence of a plurality of mobile devices within a geofence at a particular geographic location; obtaining, by the network device and from the plurality of mobile devices, information corresponding to automation settings for a security control system at the geographic location; comparing, by the network device, the obtained information corresponding to the automation settings; based on the comparison, determining, by the network device, a change to an automation setting for the security control system to be performed based on the non-presence of a particular mobile device of the plurality of mobile devices; and in response to a determination of the non-presence of the particular mobile device within the geofence, updating an automation setting for the security control system.

The details of the disclosed implementations are set forth in the accompanying drawings and the description below. Other features, objects, and advantages will be apparent from the description and drawings, and from the claims.

DESCRIPTION OF DRAWINGS

The same reference symbol used in various drawings indicates like elements.

DETAILED DESCRIPTION

Exemplary System for Performing Automation Based on a Mobile Device Location

Figure 1:
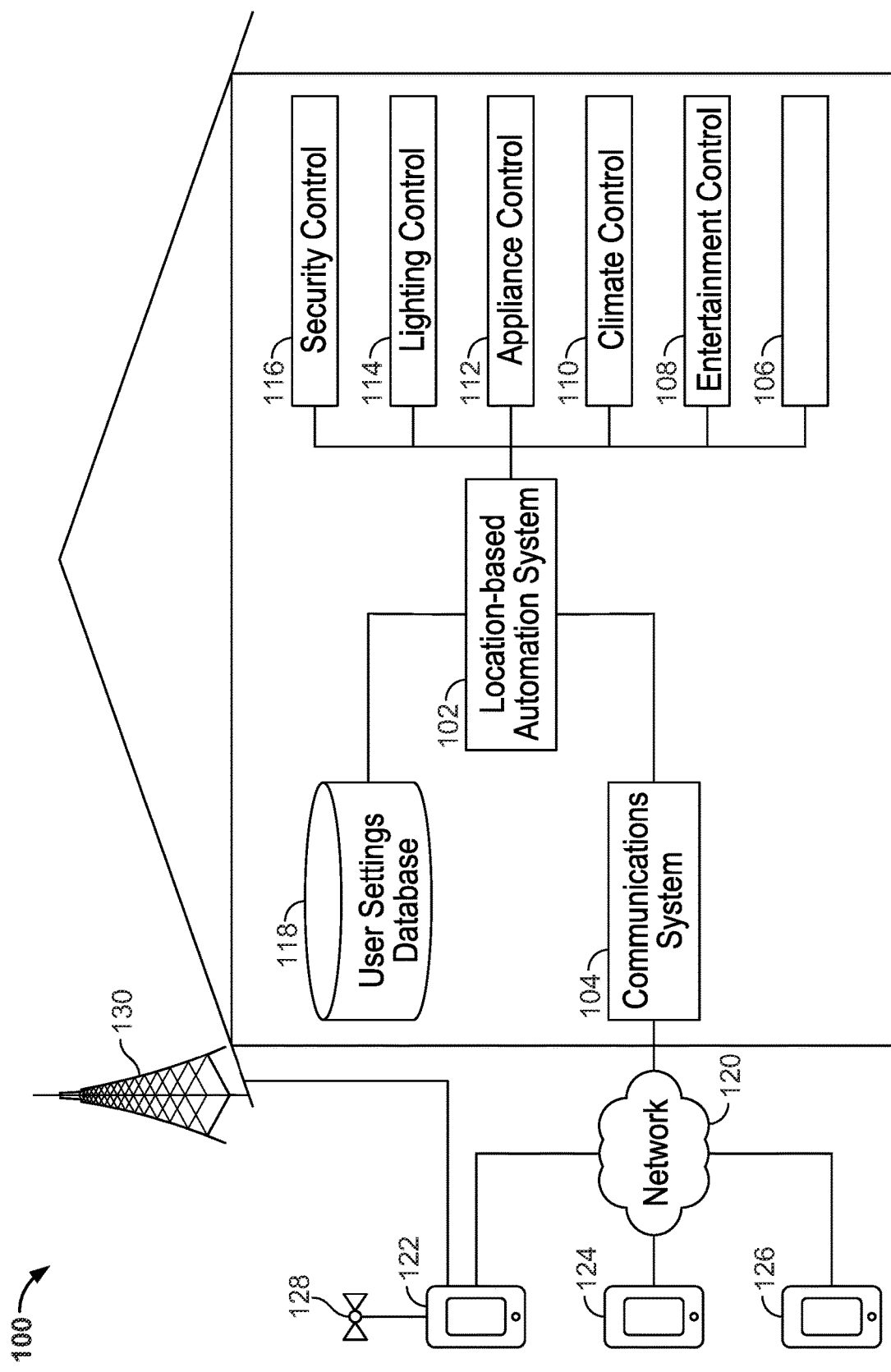
FIG. 1 illustrates an exemplary system for performing device automation based on a mobile device distance from a particular geographic location.

FIG. 1 illustrates an exemplary system 100 for performing device automation based a mobile device distance from a particular geographic location. The system 100 can include a location-based automation system 102 that is configured to select and/or adjust automation modes based in part on the geographic locations of one or more mobile devices 122, 124, and 126. The location-based automation system 102 can be associated with a particular geographic location, where the location-based automation system 102 is tasked with the automation of devices associated with, e.g., located at, the particular geographic location.

The location-based automation system 102 can communicate with a communications system 104 to determine the geographic locations of mobile devices 122, 124, and 126. The communications system 104 can interact with mobile devices 122, 124, and 126 over one or more wired or wireless networks 120, e.g., Wi-Fi, cellular, Bluetooth, the Internet. For example, the communications system 104 can send messages to the mobile devices 122, 124, and 126 to request a geographic location of the mobile device. The communications system 104 can also receive messages from the mobile devices 122, 124, and 126 providing a geographic location of the mobile device. In some implementations, the location-based automation system 102 and the communications system 104 can be part of the same device (e.g., a personal computer). In one example configuration, the communications system 104 can be a wireless transceiver coupled to or integrated with the personal computer, and the location-based automation system 102 can be implemented by software or firmware instructions that are executed by one or more processors of the personal computer. In some implementations, the location-based automation system 102 and communications system 104 can be part of a network device or appliance, including but not limited to a router or hub.

The location-based automation system 102 can interact with one or more device control systems, e.g., an entertainment control system 108, a climate control system 110, an appliance control system 112, a lighting control system 114, and a security control system 116. The device control systems can include hardware or software that is configured to obtain current device settings or determine the current state of a controlled device. For example, device hardware and/or software can indicate whether particular devices are active or inactive, or can provide one or more current settings for the particular devices. The location-based automation system 102 can use the device control systems to obtain device states and to set automation modes for the devices.

In some implementations, the device control systems can be integrated with the devices they are controlling or be part of a separate device or devices. For example, in some implementations the device control systems can be included in an X10 controller or module, which is described in the publicly available X10 standard. X10 is an international and open industry standard for communication among electronic devices used for home automation, also known as domotics. X10 primarily uses power line wiring for signaling and control, where the signals involve brief radio frequency bursts representing digital information. A wireless radio based protocol transport is also defined by the X10 specification. Other known domotic standards can be used to implement the device control systems, including but not limited to include INSTEON, KNX, System Box, LonWorks, Crestron, C-Bus, Universal powerline bus (UPB), UPnP, ZigBee and Z-Wave.

The entertainment control system 108 can be used to configure automation settings for home theater systems and music systems. In some implementations, the entertainment control system 108 can be used to automate the type of content that is played, e.g., music or movies, based on the presence of particular mobile devices 122, 124, or 126. For example, a particular music playlist can be played through a home theatre system or music system when a particular mobile device 122, 124, or 126 is detected within a specified distance of a particular geographic location.

In some implementations, when a particular geographic location has multi-room speaker systems, the entertainment control system 108 can be used to direct sound to a particular speaker system based on where a mobile device 122, 124, or 126 is located. For example, music can be played through speakers that are located in a living room when a particular mobile device 122, 124, or 126 is located in the living room. In a case where the particular mobile device 122, 124, or 126 is relocated to a new area (e.g., a backyard), the music being played through speakers that are located in the living room can be routed to speakers that are located in the new area (e.g., the backyard).

The climate control system 110 can be used to configure automation settings for climate control systems, e.g., heating and cooling, at a location. For example, temperature settings for a location (e.g., a pool, spa, home, office, or individual rooms in a home or office) can be adjusted based on a presence of particular mobile devices 122, 124, or 126.

The appliance control system 112 can be used to configure automation settings for appliances, e.g., microwave ovens, coffee machines, washing machines, televisions, and water heaters, based on a presence of particular mobile devices 122, 124, or 126.

The lighting control system 114 can be used to configure automation settings for one or more lights at a location. For example, the lighting control system 114 can activate or deactivate lights, or adjust light settings (e.g., dimming a light) in one or more areas, e.g., rooms, at the location based on a presence of particular mobile devices 122, 124, or 126. The lighting control system 114 can also automate lights based on various inputs (e.g., time, day, date, and/or month).

In some implementations, when a particular mobile device 122, 124, or 126 has been misplaced in a particular geographic location, the lighting control system 114 can be configured to activate lights in a room in which the particular mobile device was last detected. The lighting control system 114 can also deactivate lights in the remaining rooms. A user of the mobile device 122, 124, or 126 can instruct the location-based automation system 102 (e.g., using a GUI interface to the location-based automation system 102) to locate the mobile device 122, 124, or 126.

The security control system 116 can be used to configure automation settings for security systems associated with a particular geographic location based on a presence of particular mobile devices 122, 124, or 126. For example, security systems can be deactivated based in part on a presence of particular mobile devices or can be activated based in part on a non-presence of particular mobile devices. In some implementations, the presence and non-presence of mobile devices can be based on whether the mobile devices 122, 124, or 126 are within a specified distance from the particular geographic location. In some implementations, the activation and deactivation of security systems can be based in part on additional inputs (e.g., time, day, date, and/or month).

The location-based automation system 102 can communicate with a user settings database 118 to obtain user profiles associated with particular mobile devices 122, 124, and 126. The user profiles can be used to personalize automation of one or more devices at a location based on the presence of a particular mobile device 122, 124, or 126. The user profiles can be stored in the user settings database 118 and/or in the mobile devices 122, 124, and 126. For example, a user of a particular mobile device can configure settings for one or more devices (e.g., entertainment, climate, appliance, lighting, and security) and the location-based automation system 102 can automate the one or more devices based on the configured settings when the particular mobile device is within a particular distance from the geographic location associated with the location-based automation system 102.

In the example applications described above, various technologies can be used to determine the current location of a mobile device 122, 124, or 126, including short-range communication technologies such as Bluetooth or Radio-frequency Identification (RFID) tags. In some implementations, the location of a mobile device can be determined using cellular position technologies, e.g., using data received from cellular towers 130, or Wi-Fi positioning technologies (e.g., trilateralization), together with floor plan information or a map database and geocoding. If the mobile device is outdoors, the GPS or other GNSS technologies can be used to determine location of a mobile device, e.g., using data received from satellites 128. In some cases, the current location of a mobile device 122, 124, or 126 can be determined by the mobile device, e.g., using cellular or Wi-Fi position technologies. Alternatively, the mobile device 122, 124, or 126 can obtain its location from an external location service, e.g., Skyhook.

Exemplary Process for Performing Device Automation

Figure 2:
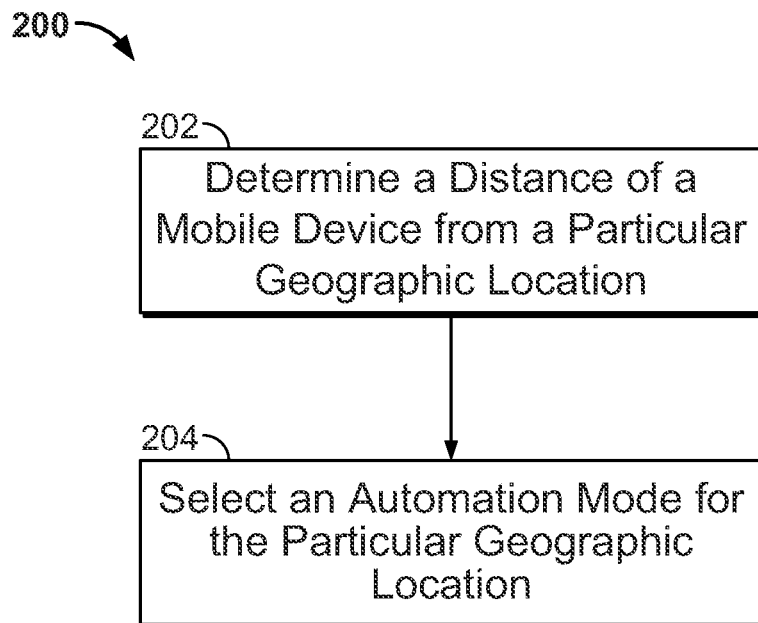
FIG. 2 illustrates an exemplary process performing device automation at a particular geographic location based on the distance of a mobile device from the particular geographic location.

FIG. 2 illustrates an exemplary process 200 for performing device automation at a particular geographic location based on the distance of a mobile device from the particular geographic location. In some implementations, process 200 can be implemented using the architecture described in reference to FIG. 5.

In some implementations, process 200 can begin by determining the distance of a mobile device from a particular geographic location (202). For example, the distance of a mobile device from a particular geographic location can be determined using the communications system 104, as described in reference to FIG. 1.

In some implementations, one or more geo-fences can be placed around the geographic locations. A geo-fence is a virtual perimeter for a real-world geographic area. A geo-fence can be dynamically generated as in a radius around a home or other point location. A geo-fence can be a pre-defined set of boundaries like neighborhood boundaries. In some implementations, when a location-aware mobile device enters or exits a geo-fence, the mobile device can receive a notification from a location-based service, which can contain information about the location of the device. In other implementations, the mobile device itself can determine when it has entered or exited a geo-fence based on knowledge of its location (e.g., using GPS, cellular or Wi-Fi positioning) and geo-fence boundaries, which can be stored on the mobile device in, for example, user settings database 118.

The geo-fence notice can be sent by the location-based service to the mobile device or directly to the location-based automation system 102 over a wireless transmission medium (e.g., Wi-Fi, Internet). If the notice is sent to the mobile device only or if the location of the mobile device computed by the mobile device, then the mobile device can send the notification directly to the location-based automation system 102 using a wireless communication link and wireless transceiver on the mobile device and part of the communication system 104. The geofences can be circular or a polygon. If circular geofences are used, then the user can specify the radius of each geofence. More than one geofence can be placed around a geographic location, and each geofence can have a different radius that can be associated by the user with an automation mode, as described in further detail below.

Each mobile device can be associated with a particular user profile, which can be stored in the user settings database 118. Further, each mobile device and/or user profile can be paired with one or more particular geographic locations. In some implementations, automation of devices at a particular geographic location is permitted for mobile devices that are paired with the particular geographic location. Thus, for example, lights and appliances at the particular geographic location can be automated when a paired mobile device is detected in proximity to the particular geographic location, but not when unpaired (e.g., unrecognized) mobile devices are detected. These pairings can be stored in the user settings database 118.

The user profile can be used to configure automation settings for one or more devices at one or more particular geographic locations. For example, a user can configure her user profile so that the temperature in a first location, e.g., a home, is set to 68 degrees and the temperature in a second location, e.g., an office, is set to 66 degrees.

Automation settings for a user profile can be configured using a mobile device associated with the user profile. The mobile device can present an automation settings interface, e.g., a GUI interface, that allows a user to configure automation settings for one or more devices at one or more particular geographic locations. The automation settings interface can also be used to configure distance settings for when a particular automation mode should be selected (e.g., select home mode when the distance of the mobile device is within 100 feet of a particular geographic location).

Process 200 can continue by selecting an automation mode for the particular geographic location based on a distance of the mobile device from the particular geographic location (204). In some implementations, the process 200 can select an automation mode, e.g., home mode, an away mode, or a vacation mode, based on how far away the mobile device is from the particular geographic location.

In some implementations, the distance of the mobile device from a particular geographic location can be defined by the radius of a circular geofence. For example, two circular geofences, each having a different radii R1, R2, can be placed around a user's home, where R2>R1, and the distance can be in feet, meters, miles or any other suitable unit of distance measure. When the distance of the mobile device less than or equal to R1, the location-based automation system 104 can enter a "home" mode, and various automation actions associated with the "home" mode can be initiated according to the user profile. When the distance of the mobile device is between R1 and R2, the location-based automation system 104 can enter an "away" mode, and various automation actions associated with the "away" mode can be initiated according to the user profile. When the distance of the mobile device is greater than R3, the location-based automation system 104 can enter a "vacation" mode, and various automation actions associated with the "vacation" mode can be initiated according to the user profile.

Before entering a particular automation mode, the location-based automation system 102 can also determine how long the mobile device has dwelled at a particular distance from the particular geographic location. For example, if the location-based automation system 102 determines that the mobile device has exited the geo-fence with radius R2 and has not re-entered that geo-fence within the last x hours (e.g., 48 hours), then the "vacation" mode can be activated. Vacation mode can be activated based on a location determination of a particular mobile device or based on the presence of or non-presence of a plurality of mobile devices associated with residents of the geographic location.

Accordingly, the dwell time of the mobile device inside or outside a geo-fence can be used with geo-fence crossing information (exit or enter information) to determine an automation mode for an environment. Once the automation mode is determined, one or more device control systems in the environment can be placed into the automation mode according to a user profile.

An automation mode can be configured to automate (e.g., adjust automation settings) of one or more devices that are associated with the particular geographic location, e.g., devices that are located in a particular home. An automation setting can indicate whether a particular device should be active or inactive. An automation setting can also indicate a configuration for the particular device (e.g., a thermostat setting, a volume level, or a light dimming setting).

For example, a home mode can be configured so that the climate at the particular geographic location is set at a certain temperature, that certain lights are active in one or more rooms, and that security systems at the particular geographic location are inactive. In some implementations, the automation mode can be configured to automate (e.g., adjust automation settings) one or more devices based on a time of day, day of the week, date, and/or month. For example, a home mode can be configured so that the climate at the particular geographic location is at one temperature between the hours of 6 am to 10 pm and at a different temperature between the hours of 10:01 pm to 5:59 am.

In another example, an away mode can be configured so that the climate at the particular geographic location is maintained at a certain temperature, that the doors and windows are locked, that the lights are off, and that security systems are active. A vacation mode can be configured so that climate control is inactive, that the doors and windows are locked, that the lights are off, and that security systems are active.

In some implementations, patterns of device usage can be monitored (e.g., times when lights are active/inactive) and the patterns can be used in the automation of devices to mimic realistic activity. For example, patterns of light usage can be monitored when mobile devices (e.g., mobile devices of users that reside at the particular geographic location) are present at the particular geographic location and the patterns can be reenacted when the vacation mode is selected, thus giving the impression that the particular geographic region is occupied.

In some implementations, the process 200 can select an automation mode based in part on where the mobile device is located relative to one or more specified distances from the particular geographic location. An automation mode can also be selected based in part on a duration that the mobile device has been beyond a particular distance from the particular geographic location. For example, the process 200 can select the home mode when the mobile device is within 50 feet of the particular geographic location. Similarly, the process 200 can select the away mode when the mobile device distance exceeds 2 miles from the particular geographic location. Further, the process 200 can select the vacation mode when the mobile device distance exceeds 250 miles or if the mobile device distance exceeds 2 miles from the particular geographic location for a particular time period, e.g., overnight.

In some implementations, the process 200 can monitor the mobile device distance and can adjust the automation mode as the mobile device approaches a particular geographic location. For example, the process 200 can determine that the mobile device is traveling toward the particular geographic location and, in response to the determination, can select the home mode.

In some implementations, the process 200 can measure the distance of the mobile device based on check-ins on social networking sites by a user operating the mobile device. For example, a user operating the mobile device may check-in at a restaurant that is located 15 miles away from the particular geographic location. The process 200 can determine that the restaurant at which the user checked-in is located 15 miles from the particular geographic location and, in response to the determination, can select an appropriate automation mode based on that determination.

In some implementations, the process 200 can monitor the mobile device distance and can predict an estimated time of arrival of the user associated with the mobile device. The process 200 can gradually adjust the automation mode of one or more devices (e.g., a climate control system or a pool temperature), so that the automation settings specified by the user associated with the mobile device are reached upon the user's arrival.

The process 200 can evaluate additional inputs when selecting an automation mode based on the mobile device location. For example, activity occurring at the particular geographic location (e.g., opening of doors, activating/deactivating lights and appliances) can be evaluated to determine whether a different automation mode should be selected (e.g., whether the system should remain in home mode or switch to away mode). In another example, the presence of a resident's keys within the particular geographic location can prevent selection of an away or vacation mode (e.g., to prevent doors from being locked even though the mobile device is no longer within the particular geographic location). Other automation settings can be configured based on the presence or non-presence of one of more other detected items that are identified as being associated with a resident.

Figure 3:
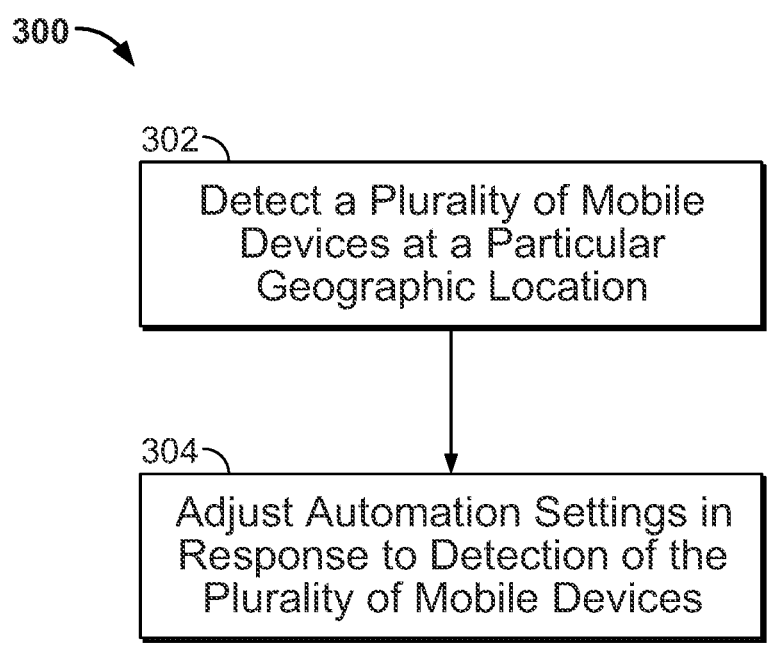
FIG. 3 illustrates an exemplary process for adjusting device automation based on a plurality of mobile devices.

Exemplary Process for Adjusting Device Automation Based on a Plurality of Mobile Devices FIG. 3 illustrates an exemplary process for adjusting device automation based on a plurality of mobile devices. In some implementations, process 300 can be implemented using the architecture described in reference to FIG. 5.

In some implementations, process 300 can begin by detecting a plurality of mobile devices at a particular geographic location (302). The presence of mobile devices can be detected using, for example, the communications system 104, as described in reference to FIG. 1.

Process 300 can continue by adjusting automation modes of the one or more devices at the location (304). In some implementations, automation of devices at a particular geographic location is permitted for mobile devices that are paired with the particular geographic location. Thus, for example, lights and appliances at the particular geographic location can be automated when a paired mobile device is detected in proximity to the particular geographic location, but not when unpaired (e.g., unrecognized) mobile devices are detected.

In some implementations, automation modes of the one or more devices can be adjusted to accommodate automation settings configured by users of multiple paired mobile devices. For example, in a case where multiple mobile devices are identified in proximity to a particular geographic location, automation settings for a selected automation made can be adjusted (e.g., averaged) to accommodate automation settings that were configured by users of the multiple mobile devices. Thus, if a first user of a first mobile device has indicated a thermostat temperature preference of 65 degrees and a second user of a second mobile device has indicated a thermostat temperature preference of 70 degrees, then the thermostat temperature can be averaged between the indicated preferences to set a thermostat temperature of 67.5 degrees.

In some implementations, devices at a particular geographic location are automated based on detection of both paired and unpaired mobile devices at the particular geographic location. In such implementations, automation modes of the one or more devices can be adjusted based on the presence of multiple mobile devices at the geographic locations. For example, if threshold number (e.g., 10) of mobile devices is detected at the particular geographic location, then automation settings of devices at the particular geographic location can be adjusted to accommodate the increased number of occupants. In this example, the thermostat temperature can be reduced; the volume level of one or more music systems can be increased; and certain lights can be dimmed, activated or deactivated.

In some implementations, mobile devices detected at the particular geographic location can be used to automate selection of entertainment options (e.g., audio or video) being played at the particular geographic location.

For example, music playlists associated with the detected mobile devices can be compared to identify songs that are common (e.g., songs stored on a threshold percentage of the detected mobile devices), songs that are uncommon (e.g., songs not stored on a threshold percentage of the detected mobile devices), or songs that are popular among the detected mobile devices (e.g., songs that have been rated at or above a threshold rating by a threshold percentage of users of the mobile devices using a music application or a social networking site). The identified songs can be played through a music system or home theater system located at the particular geographic location.

Similarly, when determining which movie to play through a home theater system at the particular geographic location, mobile devices detected at the particular geographic location can be compared to identify movies that have been viewed by or are popular (e.g., movies that have been rated at or above a threshold rating by a threshold percentage of users of the mobile devices using a movie application or a social networking site) among the detected mobile devices. The identified movies can be played through the home theater system located at the particular geographic location.

Exemplary View for Illustrating Geofences at a Particular Geographic Location

Figures 4, 5:
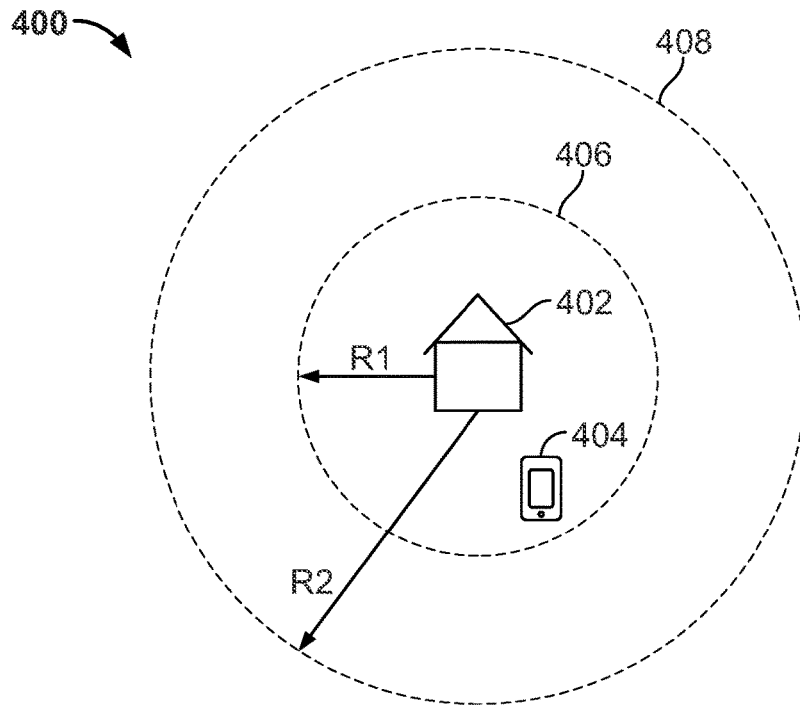
FIG. 4 is an exemplary view for illustrating geofences at a particular geographic location.
FIG. 5 illustrates an exemplary graphical user interface for automating devices at a particular geographic location.

FIG. 4 is an exemplary view 400 for illustrating geofences 406 and 408 at a particular geographic location 402. The geofences are virtual perimeters for a real-world geographic area. The geofences can be defined using radii originating from the particular geographic location 402 or using some other geographic boundary, e.g., coordinates that define a particular neighborhood, zip code, city, state, country, or continent.

In FIG. 4, the geofence 406 is defined using a radius R1 and the geofence 408 is defined using the radius R2. The distance between radii R1 and R2 can be in feet, meters, miles, or any other suitable unit of distance measure. A mobile device 404 can be associated with the particular geographic location 402. Further, automation of devices at the particular geographic location 402 can be triggered based on a position of the mobile device 404 relative to the geofences 406 and 408. Automation can be triggered based specifically on the position of the mobile device 404 or based on a comparison or averaging of the position of the mobile device 404 with other mobile devices associated with the geographic location 402.

For example, when the distance of the mobile device 404 less than or equal to R1, the location-based automation system 104 can enter a "home" mode, and various automation actions associated with the "home" mode can be initiated according to the user profile. Similarly, when the distance of the mobile device is between R1 and R2, the location-based automation system 104 can enter an "away" mode, and various automation actions associated with the "away" mode can be initiated according to the user profile. Further, when the distance of the mobile device is greater than R2, the location-based automation system 104 can enter a "vacation" mode, and various automation actions associated with the "vacation" mode can be initiated according to the user profile.

Exemplary GUI for Automating Devices

FIG. 5 illustrates an exemplary graphical user interface (GUI) 500 for automating devices at a particular geographic location. For example, the GUI 500 can be accessed on a display coupled to the location-based automation system 106 or through a mobile device.

The GUI 500 includes a mobile device identifier field 502, an environment field 504, a radius field 506, and a mode field 508. The mobile device identifier field 502 can be configured to specify a particular mobile device, e.g., "Mobile Device 1" and "Mobile Device 2". Mobile devices can be specified using unique mobile device identifiers, e.g., an International Mobile Equipment Identity (IMEI) number. Each mobile device can be associated with one or more geographic locations, i.e., environments. The geographic locations can be specified in the environment field 504. In some implementations, a particular geographic location, e.g., "Home", can be subdivided into several environments, e.g., "Living room", "Backyard", and "Pool area".

Automation settings for particular mobile devices are specified in the radius field 506 and the mode field 508. In particular, the mode field 508 can indicate a particular automation mode and the radius field 506 can specify a distance. As a result, the particular automation mode can be triggered when a particular mobile device is within the specified distance. The distance can be specified relative to a particular geographic location, e.g., trigger an automation mode when a particular mobile device is less than or equal to a specified distance, or as a bounded distance, e.g., trigger an automation mode when a particular mobile device is between a first and second distance.

Exemplary Operating Environment

Figure 6:
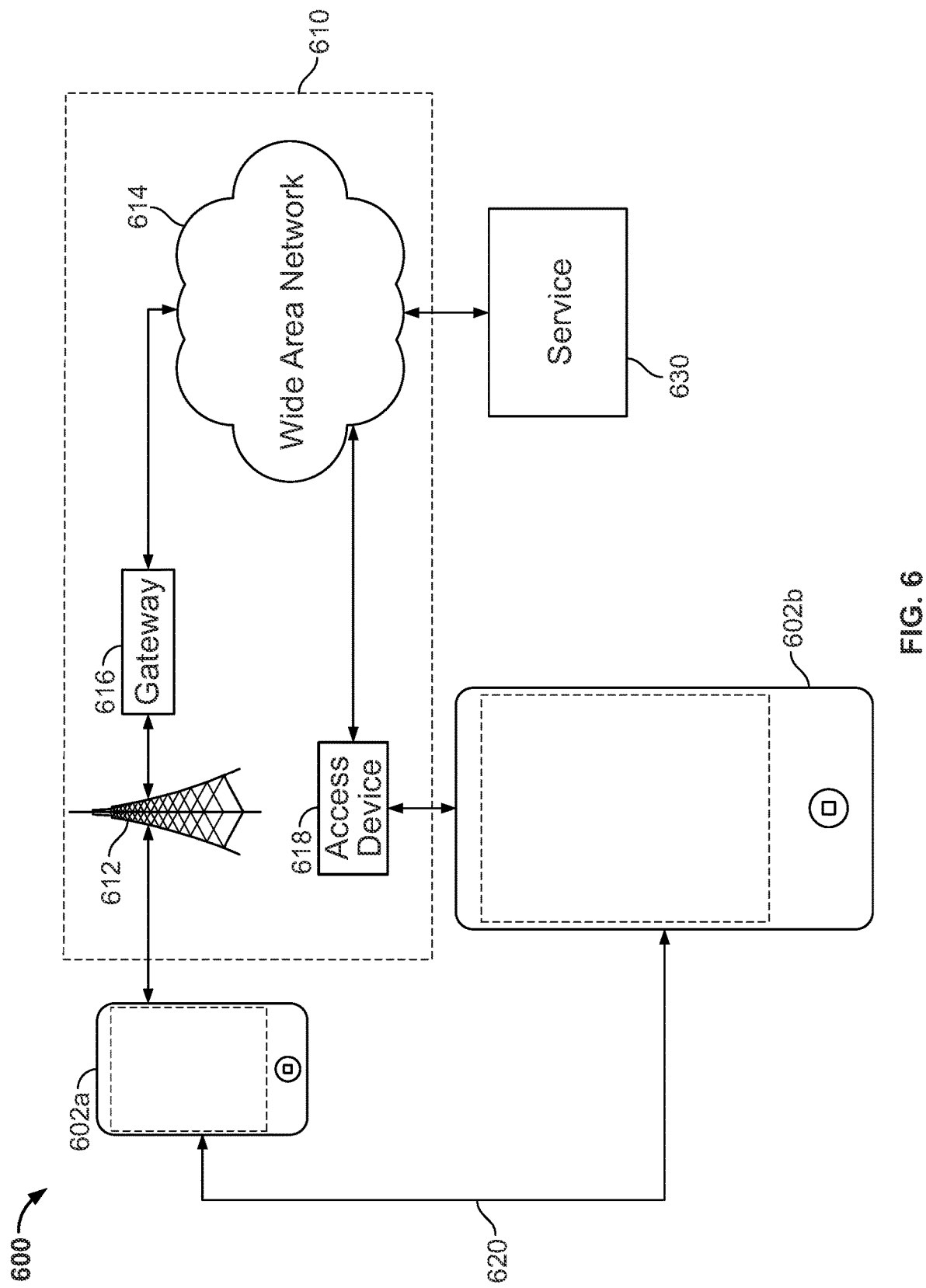
FIG. 6 is a block diagram of an exemplary operating environment for a device capable of running a device automation application.

FIG. 6 is a block diagram of an exemplary operating environment for a device capable of running a device automation application. In some implementations, devices 602a and 602b can communicate over one or more wired or wireless networks 610. For example, wireless network 612 (e.g., a cellular network) can communicate with a wide area network (WAN) 614 (e.g., the Internet) by use of gateway 616. Likewise, access device 618 (e.g., IEEE 802.11g wireless access device) can provide communication access to WAN 1114. Devices 602a, 602b can be any device capable of displaying GUIs of the disclosed device automation application, including but not limited to portable computers, smart phones and electronic tablets. In some implementations, the devices 602a, 602b do not have to be portable but can be a desktop computer, television system, kiosk system or the like.

In some implementations, both voice and data communications can be established over wireless network 612 and access device 618. For example, device 602a can place and receive phone calls (e.g., using voice over Internet Protocol (VoIP) protocols), send and receive e-mail messages (e.g., using SMTP or Post Office Protocol 3 (POP3)), and retrieve electronic documents and/or streams, such as web pages, photographs, and videos, over wireless network 612, gateway 616, and WAN 614 (e.g., using Transmission Control Protocol/Internet Protocol (TCP/IP) or User Datagram Protocol (UDP)). Likewise, in some implementations, device 602b can place and receive phone calls, send and receive e-mail messages, and retrieve electronic documents over access device 618 and WAN 614. In some implementations, device 602a or 602b can be physically connected to access device 618 using one or more cables and access device 618 can be a personal computer. In this configuration, device 602a or 602b can be referred to as a "tethered" device.

Devices 602a and 602b can also establish communications by other means. For example, wireless device 602a can communicate with other wireless devices (e.g., other devices 602a or 602b, cell phones) over the wireless network 612. Likewise, devices 602a and 602b can establish peer-to-peer communications 620 (e.g., a personal area network) by use of one or more communication subsystems, such as the Bluetooth™ communication devices. Other communication protocols and topologies can also be implemented.

Devices 602a or 602b can communicate with service 630 over the one or more wired and/or wireless networks 610. For example, service 630 can be an online device automation application service that includes the features described in reference to FIGS. 1-3.

Device 602a or 602b can also access other data and content over one or more wired and/or wireless networks 610. For example, content publishers, such as news sites, Really Simple Syndication (RSS) feeds, Web sites and developer networks can be accessed by device 602a or 602b. Such access can be provided by invocation of a web browsing function or application (e.g., a browser) running on the device 602a or 602b.

Devices 602a and 602b can exchange files over one or more wireless or wired networks 610 either directly or through service 630.

Exemplary Device Architecture

Figure 7:
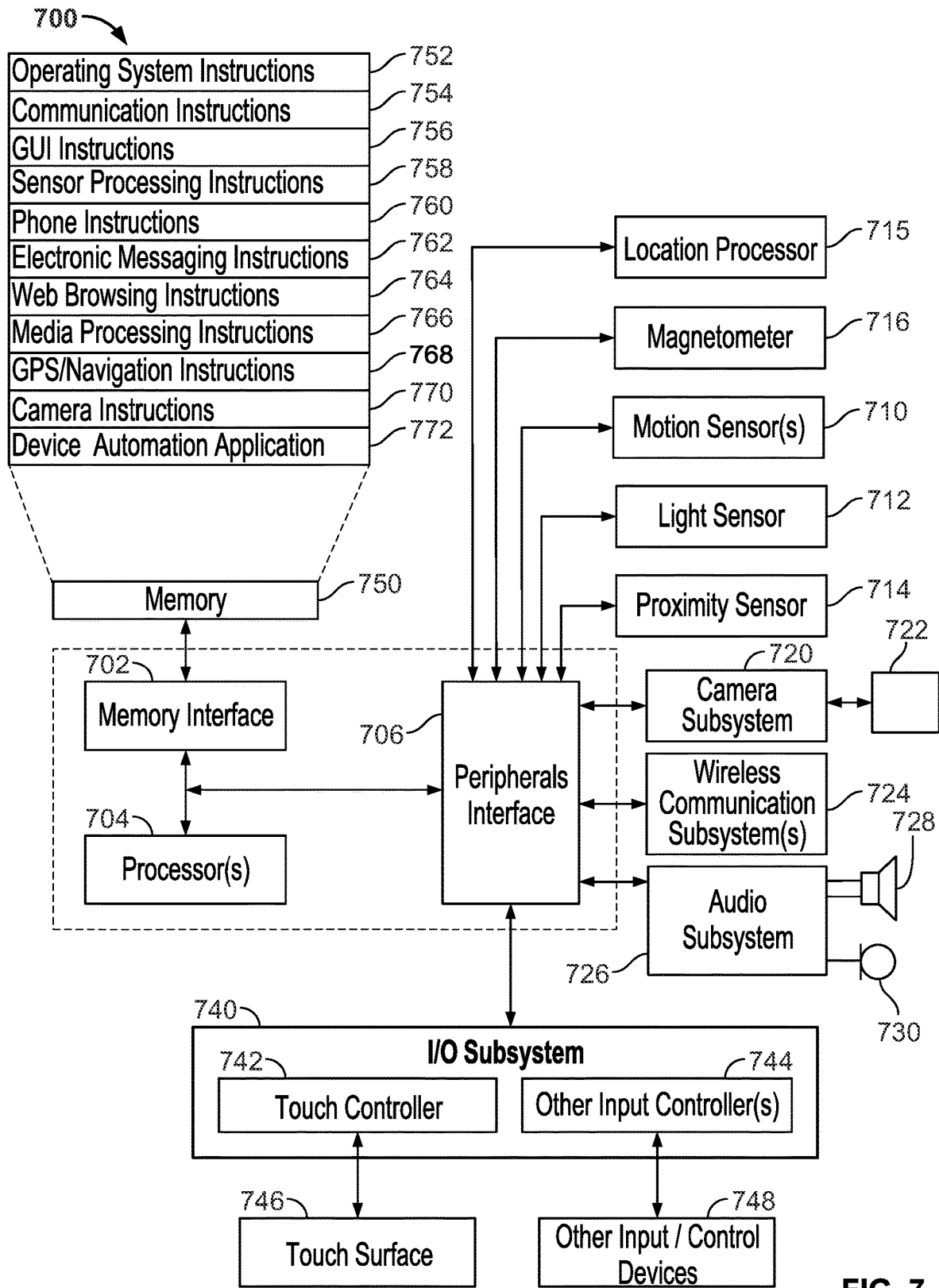
FIG. 7 is a block diagram of an exemplary architecture for a device capable of running a device automation application.

FIG. 7 is a block diagram of an exemplary architecture for a device capable of running the disclosed device automation application. Architecture 700 can be implemented in any device for generating the features described in reference to FIGS. 1-3, including but not limited to portable or desktop computers, smart phones and electronic tablets, television systems, game consoles, kiosks and the like. Architecture 700 can include memory interface 702, data processor(s), image processor(s) or central processing unit(s) 704, and peripherals interface 706. Memory interface 702, processor (s) 704 or peripherals interface 706 can be separate components or can be integrated in one or more integrated circuits. The various components can be coupled by one or more communication buses or signal lines.

Sensors, devices, and subsystems can be coupled to peripherals interface 706 to facilitate multiple functionalities. For example, motion sensor 710, light sensor 712, and proximity sensor 714 can be coupled to peripherals interface 706 to facilitate orientation, lighting, and proximity functions of the device. For example, in some implementations, light sensor 712 can be utilized to facilitate adjusting the brightness of touch surface 746. In some implementations, motion sensor 710 (e.g., an accelerometer, gyros) can be utilized to detect movement and orientation of the device. Accordingly, display objects or media can be presented according to a detected orientation (e.g., portrait or landscape).

Other sensors can also be connected to peripherals interface 706, such as a temperature sensor, a biometric sensor, or other sensing device, to facilitate related functionalities.

Location processor 715 (e.g., GPS receiver) can be connected to peripherals interface 706 to provide geo-positioning. Electronic magnetometer 716 (e.g., an integrated circuit chip) can also be connected to peripherals interface 706 to provide data that can be used to determine the direction of magnetic North. Thus, electronic magnetometer 716 can be used as an electronic compass.

Camera subsystem 720 and an optical sensor 722, e.g., a charged coupled device (CCD) or a complementary metal-oxide semiconductor (CMOS) optical sensor, can be utilized to facilitate camera functions, such as recording photographs and video clips.

Communication functions can be facilitated through one or more communication subsystems 724. Communication subsystem(s) 724 can include one or more wireless communication subsystems. Wireless communication subsystems 724 can include radio frequency receivers and transmitters and/or optical (e.g., infrared) receivers and transmitters. Wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving or transmitting data. The specific design and implementation of the communication subsystem 724 can depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, 802.x communication networks (e.g., WiFi, WiMax, or 3G networks), code division multiple access (CDMA) networks, and a Bluetooth™ network. Communication subsystems 724 may include hosting protocols such that the device may be configured as a base station for other wireless devices. As another example, the communication subsystems can allow the device to synchronize with a host device using one or more protocols, such as, for example, the TCP/IP protocol, HTTP protocol, UDP protocol, and any other known protocol.

Audio subsystem 726 can be coupled to a speaker 728 and one or more microphones 730 to facilitate voice-enabled functions, such as voice recognition, voice replication, digital recording, and telephony functions.

I/O subsystem 740 can include touch controller 742 and/or other input controller(s) 744. Touch controller 742 can be coupled to a touch surface 746. Touch surface 746 and touch controller 742 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 746. In one implementation, touch surface 746 can display virtual or soft buttons and a virtual keyboard, which can be used as an input/output device by the user.

Other input controller(s) 744 can be coupled to other input/control devices 748, such as one or more buttons, rocker switches, thumb-wheel, infrared port, USB port, and/or a pointer device such as a stylus. The one or more buttons (not shown) can include an up/down button for volume control of speaker 728 and/or microphone 730.

In some implementations, device 700 can present recorded audio and/or video files, such as MP3, AAC, and MPEG files. In some implementations, device 700 can include the functionality of an MP3 player and may include a pin connector for tethering to other devices. Other input/output and control devices can be used.

Memory interface 702 can be coupled to memory 750. Memory 750 can include high-speed random access memory or non-volatile memory, such as one or more magnetic disk storage devices, one or more optical storage devices, or flash memory (e.g., NAND, NOR). Memory 750 can store operating system 752, such as Darwin, RTXC, LINUX, UNIX, OS X, WINDOWS, or an embedded operating system such as VxWorks. Operating system 752 may include instructions for handling basic system services and for performing hardware dependent tasks. In some implementations, operating system 752 can include a kernel (e.g., UNIX kernel).

Memory 750 may also store communication instructions 754 to facilitate communicating with one or more additional devices, one or more computers or servers. Communication instructions 754 can also be used to select an operational mode or communication medium for use by the device, based on a geographic location (obtained by the GPS/Navigation instructions 768) of the device. Memory 750 may include graphical user interface instructions 756 to facilitate graphic user interface processing; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions and display GUIs described in reference to FIG. 5; media processing instructions 766 to facilitate media processing-related processes and functions; GPS/Navigation instructions 768 to facilitate GPS and navigation-related processes; camera instructions 770 to facilitate camera-related processes and functions; and instructions 772 for a device automation application that is capable of configuring automation settings for one or more particular geographic locations, as described in reference to FIGS. 1-3. The memory 750 may also store other software instructions for facilitating other processes, features and applications, such as applications related to navigation, social networking, location-based services or map displays.

Each of the above identified instructions and applications can correspond to a set of instructions for performing one or more functions described above. These instructions need not be implemented as separate software programs, procedures, or modules. Memory 750 can include additional instructions or fewer instructions. Furthermore, various functions of the mobile device may be implemented in hardware and/or in software, including in one or more signal processing and/or application specific integrated circuits.

What is claimed is:

1. A method comprising:
   identifying, by a network device, presence of a plurality of mobile devices at a particular geographic location;
   obtaining, by the network device, information corresponding to automation settings for a security control system at the geographic location;
   comparing, by the network device, the obtained information corresponding to the automation settings;
   based on the comparison, determining, by the network device, a change to an automation setting for the security control system to be performed based on an absence of a particular mobile device of the plurality of mobile devices; and in response to a determination of the absence of the particular mobile device at the geographic location, updating an automation setting for the security control system.

2. The method as in claim 1, wherein identifying the presence of the plurality of mobile devices at a particular geographic location includes identifying the presence of the plurality of mobile devices within a geofence associated with the particular geographic location.

3. The method as in claim 2, further comprising updating the automation setting for the security control system upon entry or exit of the geofence by the particular mobile device.

4. The method as in claim 1, wherein the change to the automation setting for the security control system is determined in part based on a time and date.

5. The method as in claim 1, further comprising controlling an element of the security control system based on the automation setting.

6. The method as in claim 1, further comprising obtaining, by the network device, the information corresponding to the automation settings for the security control system, from a settings database that is accessible to the network device.

7. The method as in claim 1, further comprising obtaining, by the network device, the information corresponding to the automation settings for the security control system from one or more of the plurality of mobile devices.

8. The method as in claim 7, further comprising, before obtaining the information corresponding to automation settings for the security control system from the one or more of the plurality of mobile devices, determining that the one or more of the plurality of mobile devices is paired with the geographic location of the security control system.

9. A non-transitory machine-readable medium having instructions stored thereon, the instructions to cause one or more processors to perform operations comprising:
identifying, by a network device, presence of a plurality of mobile devices at a particular geographic location;
obtaining, by the network device, information corresponding to automation settings for a security control system at the geographic location;
comparing, by the network device, the obtained information corresponding to the automation settings;
based on the comparison, determining, by the network device, a change to an automation setting for the security control system to be performed based on an absence of a particular mobile device of the plurality of mobile devices; and
in response to a determination of the absence of the particular mobile device at the geographic location, updating an automation setting for the security control system.

10. The non-transitory machine readable medium as in claim 9, wherein identifying the presence of the plurality of mobile devices at a particular geographic location includes identifying the presence of the plurality of mobile devices within a geofence associated with the particular geographic location.

11. The non-transitory machine readable medium as in claim 10, the operations further comprising updating the automation setting for the security control system upon entry or exit of the geofence by the particular mobile device.

12. The non-transitory machine readable medium as in claim 9, wherein the change to the automation setting for the security control system is determined in part based on a time and date.

13. The non-transitory machine readable medium as in claim 9, the operations further comprising controlling an element of the security control system based on the automation setting.

14. The non-transitory machine readable medium as in claim 9, the operations further comprising obtaining, by the network device, the information corresponding to the automation settings for the security control system, from a settings database that is accessible to the network device.

15. The non-transitory machine readable medium as in claim 9, further comprising obtaining, by the network device, the information corresponding to the automation settings for the security control system from one or more of the plurality of mobile devices, and before obtaining the information, determining that the one or more of the plurality of mobile devices is paired with the geographic location of the security control system.

16. A data processing system comprising:
one or more processors;
memory coupled to the one or more processors and configured for storing instructions, which, when executed by the one or more processors, causes the one or more processors to perform operations comprising:
identifying, by a network device, presence of a plurality of mobile devices at a particular geographic location;
obtaining, by the network device, information corresponding to automation settings for a security control system at the geographic location;
comparing, by the network device, the obtained information corresponding to the automation settings;
based on the comparison, determining, by the network device, a change to an automation setting for the security control system to be performed based on an absence of a particular mobile device of the plurality of mobile devices; and
in response to a determination of the absence of the particular mobile device at the geographic location, updating an automation setting for the security control system and controlling an element of the security control system based on the automation setting.

17. The data processing system as in claim 16, wherein identifying the presence of the plurality of mobile devices at a particular geographic location includes identifying the presence of the plurality of mobile devices within a geofence associated with the particular geographic location.

18. The data processing system as in claim 17, the operations further comprising updating the automation setting for the security control system upon entry or exit of the geofence by the particular mobile device.

19. The data processing system as in claim 16, wherein the change to the automation setting for the security control system is determined in part based on a time and date.

20. The data processing system as in claim 16, the operations further comprising obtaining, by the network device, the information corresponding to the automation settings for the security control system, from a settings database that is accessible to the network device or from one or more of the plurality of mobile devices that are paired with the geographic location of the security control system.

* * * * *